United States Patent
Yang et al.

(10) Patent No.: US 9,670,357 B2
(45) Date of Patent: Jun. 6, 2017

(54) ANTIMONY-FREE FLAME RETARDANT POLYESTER COMPOSITION

(71) Applicant: SABIC Innovative Plastics IP B.V., Bergen Op Zoom (NL)

(72) Inventors: Yuzhen Yang, Evansville, IN (US); Tianhua Ding, Newburgh, IN (US)

(73) Assignee: SABIC Global Technologies B.V., Pimfield, MA (US)

( * ) Notice: Subject to any disclaimer, the term of this patent is extended or adjusted under 35 U.S.C. 154(b) by 204 days.

(21) Appl. No.: 13/909,495

(22) Filed: Jun. 4, 2013

(65) Prior Publication Data
US 2014/0357760 A1    Dec. 4, 2014

(51) Int. Cl.
C08L 83/00    (2006.01)
C08L 67/02    (2006.01)
C08K 5/52     (2006.01)

(52) U.S. Cl.
CPC ............ *C08L 67/02* (2013.01); *C08K 5/5205* (2013.01); *C08L 2201/02* (2013.01)

(58) Field of Classification Search
CPC .................................................. C08L 67/02
USPC .......................................... 523/201; 524/100
See application file for complete search history.

(56) References Cited

U.S. PATENT DOCUMENTS

| | | | |
|---|---|---|---|
| 6,538,054 B1 * | 3/2003 | Klatt et al. | 524/101 |
| 7,829,614 B2 * | 11/2010 | Ding et al. | 524/126 |
| 8,138,244 B2 * | 3/2012 | Ding et al. | 524/100 |
| 8,247,477 B2 | 8/2012 | Miyamoto | |
| 8,686,072 B2 * | 4/2014 | Ding et al. | 524/100 |
| 8,716,378 B2 * | 5/2014 | Ding et al. | 524/101 |
| 2003/0022969 A1 | 1/2003 | Gosens et al. | |
| 2010/0168289 A1 * | 7/2010 | Ding et al. | 524/100 |
| 2011/0319536 A1 | 12/2011 | Ding et al. | |

FOREIGN PATENT DOCUMENTS

| | | |
|---|---|---|
| DE | 112006001824 | 5/2008 |
| EP | 0624626 | 8/1999 |
| EP | 1614716 A1 | 1/2006 |
| WO | WO 2009-083913 | 7/2009 |

OTHER PUBLICATIONS

PCT/US2014/040614 International Search Report and Written Opinion, mailed Sep. 29, 2014.
Papazoglou, E. S., Ph.D., The McGraw-Hill Companies, Inc., Chapter 4, "Flame Retardants for Plastics", 2004; pp. 1-88.
BASF Corporation, BASF Aerospace Materials, Melapur, "Halogen free flame retardants", 2011, pp. 1-4.
PCT/US2014040614 Extended Search Report.

\* cited by examiner

*Primary Examiner* — Hannah Pak
(74) *Attorney, Agent, or Firm* — Honigman Miller Schwartz and Cohn LLP; Heidi M. Berven

(57) ABSTRACT

Disclosed herein is a polyalkylene terephthalate flame retardant composition, comprising (a) 30 to 60 parts by weight of a polyalkylene terephthalate or a mixture of polyalkylene terephthalates, (b) 0.25 to 2.5 parts by weight of an antidrip agent, (c) 4 to 18 parts by weight of melamine polyphosphate (hereinafter "MPP"), and (d) 12 to 26 parts by weight of poly(pentabromobenzylacrylate) (hereinafter "PBBPA"), provided that the combined amount of MPP and PBBPA is at least 18 parts by weight and less than or equal to 30 parts by weight and provided that the composition is substantially antimony free. The invention also provides processes for making such compositions as well as articles derived therefrom.

9 Claims, No Drawings

ANTIMONY-FREE FLAME RETARDANT POLYESTER COMPOSITION

BACKGROUND OF THE INVENTION

Polyalkylene terephthalates, particularly polybutylene terephthalate (PBT) and polyethylene terephthalate (PET), are thermoplastic polyester resins with good electrical properties that are widely used as insulators to cover electrical wires and other electronics components. One criteria expected for the use of thermoplastic resins in electronics is that they must self-extinguish after catching fire as indicated by a UL 94 test rating of V-0. The V-0 test rating includes the requirement that the material tested may not burn with flaming combustion for more than 10 seconds after application of a test flame.

However, as the polyalkylene terephthalates are fairly combustible and, even with the addition of fire retardants (FR), they may not meet the requirements for a UL 94 V-0 rating particularly for thin-walled applications such as thin-walled electrical connectors.

Through the addition of antimony compounds, as a flame poison, typically antimony trioxide, in combination with an organo-halide flame retardant, preferably an organo-bromide, suitable self-extinguishing PBT blends have been developed.

Antimony trioxide by itself is not a fire retardant, and the organo-halide flame retardants, by themselves, are typically insufficient in PBT formulations to achieve a V-0 rating without jeopardizing the mechanical properties of the PBT formulation. However, when combined, they act synergistically to form a very effective flame retardant system for polyalkylene terephthalates.

As a result of this synergy, with low amounts of antimony, equivalent or better fire retardancy can be achieved with substantially reduced amounts of the organo-halide agent.

Thus, to achieve a V-0 rating, PBT formulations frequently require an organo-bromo FR agent, an antimony FR synergist and, to meet the UL 94 V-0 rating drip requirement, a fluoropolymer antidrip component.

Recently, there has been a desire to eliminate antimony trioxide from PBT formulations due to significant increases in its cost as well as human health concerns in some countries. Antimony trioxide has been found, in some studies, to be a potential hazard for human health due to the possibility of skin irritation, lung toxicity, teratogenicity and lung carcinogenicity after repeated exposure.

Consequently, there is an ongoing need for flame retardant polyalkylene terephthalate compositions that are antimony-free, but that maintain or surpass the performance attributes of currently available flame retardant polyester compositions for thin-walled electronics uses.

SUMMARY OF THE INVENTION

These and other needs are met by the present invention which is directed to flame retardant polyalkylene terephthalate compositions that are substantially antimony-free.

Specifically, the present invention is directed to a polyalkylene terephthalate flame retardant composition, comprising (a) 30 to 60 parts by weight of a polyalkylene terephthalate or a mixture of polyalkylene terephthalates, (b) 0.25 to 2.5 parts by weight of an antidrip agent, (c) 4 to 18 parts by weight of melamine polyphosphate (hereinafter "MPP"), and (d) 12 to 26 parts by weight of poly(pentabromobenzylacrylate) (hereinafter "PBBPA"), provided that the combined amount of MPP and PBBPA is at least 18 parts by weight and less than or equal to 30 parts by weight and provided that the composition is substantially antimony free.

These compositions of the present invention have a UL 94 rating of V-0, for a 0.71 mm thick specimen, conditioned at 23° C. and 50% relative humidity for 48 hours; or (ii) a UL 94 rating of V-0, for a 0.71 mm thick specimen conditioned at 70° C. for 168 hours; or (iii) both.

DETAILED DESCRIPTION OF THE INVENTION

The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another.

"Substantially antimony-free," as used herein, means that the polyalkylene terephthalate composition, of the present invention, contains no antimony other than a residual amount from an antimony catalyst if used in the synthesis of a component of the composition, such as polyethylene terephthalate, as measured by presently available methods. Typically, a substantially antimony-free polyalkylene terephthalate composition contains less than 0.001 parts by weight of antimony catalyst.

Polyalkylene Terephthalate

The composition comprises a polyalkylene terephthalate or a mixture of polyalkylene terephthalates. Polyalkylene terephthalates in the context of the invention are polyalkylene terephthalates which are derived from terephthalic acid (or its reactive derivatives) and alkanediols, for example based on ethylene glycol, propylene glycol or butanediol or copolymerized polyesters having polyalkylene terephthalate as a principal component included in a polyester. Examples of the polyalkylene terephthalates, of the present invention include, but are not limited to, poly(ethylene terephthalate) ("PET"), poly(ethylene terephthalate-co-ethylene adipate ("PETA"), poly(butylene terephthalate) ("PBT"), poly(propylene terephthalate) ("PPT"), poly(cyclohexylenedimethylene terephthalate) ("PCT"), poly(trimethylene terephthalate) ("PTT"), poly(1,4-cyclohexylene dimethylene terephthalate-co-isophthalate) ("PCTA"), glycol modified polycyclohexylenedimethylene terephthalate ("PCTG"), glycol-modified polyethylene terephthalate ("PETG"), or combinations of one or more of each type of the polyalkylene terephthalates. As defined herein, polybutylene terephthalate or PBT includes PBT made from terephthalic acid, from dimethyl terephthalate, from recycled PET and from any other material that may be used to produce PBT.

In one embodiment, the polyalkylene terephthalate is PET, PBT, a combination of PBTs or a combination of PBT and PET. Even more particularly, the polyalkylene terephthalate is PBT or a combination of PBTs.

In a particular embodiment, the polyalkylene terephthalate is a PBT having an intrinsic viscosity of 0.4 to 1.4 cm$^3$/g. As used herein, intrinsic viscosity is measured in a 60:40 mixture of phenol/tetrachloroethane mixture at 25° C. according to ASTM D 2857-70 using a viscosimeter according to DIN 51562. More particularly, the composition of the present invention comprises a mixture of a first polybutylene terephthalate, having an intrinsic viscosity of >0.8 to 1.4 cm$^3$/g and a second polybutylene terephthalate having an intrinsic viscosity of 0.4 to 0.8 cm$^3$/g.

Even more particularly, the composition comprises 5 to 9 parts by weight of a PBT having an intrinsic viscosity of 1.15 to 1.25 cm$^3$/g and 28 to 50 parts by weight of a PBT having an intrinsic viscosity of 0.6 to 0.7 cm$^3$/g. In yet another embodiment, the composition comprises 6 to 9 parts by weight of a PBT having an intrinsic viscosity of 1.2 cm$^3$/g and 30 to 50 parts by weight of a PBT having an intrinsic viscosity of 1.2 cm$^3$/g.

Antidrip Agent

In addition to the polyalkylene terephthalate, the composition contains an antidrip agent, such as, for example a fibril forming or non-fibril forming fluoropolymer such as polytetrafluoroethylene (PTFE). The anti-drip agent may be encapsulated by a rigid copolymer as described above, for example styrene acrylonitrile resin (SAN). PTFE encapsulated in SAN is known as TSAN. Encapsulated fluoropolymers may be made by polymerizing the encapsulating polymer in the presence of the fluoropolymer, for example an aqueous dispersion.

The antidrip agent is generally used in the compositions of the invention in amounts of about 0.1 to about 5 parts by weight, and more preferably about 0.25 to 2 parts by weight.

Flame Retardant

In addition to the polyalkylene terephthalate and the antidrip agent, the composition contains a flame retardant. The flame retardant is an antimony-free flame retardant and is a combination of the phosphate flame retardant, melamine polyphosphate (MPP) (CAS No. 218768-84-4), and the brominated flame retardant poly(pentabromobenzylacrylate). The total combined parts by weight of melamine polyphosphate and poly(pentabromobenzylacrylate) (PBBPA) (CAS Reg. No. 59447-57-3), used in the composition of the present invention, is between 18 to 30 parts by weight. PBBPA is available from a number of vendors including Sigma Aldrich and ICL Industrial Products by which it is sold as FR1025.

In one embodiment, the composition comprises 4.25 to 15.75 parts by weight of melamine polyphosphate and 14.25 to 25.75 parts by weight of poly(pentabromobenzylacrylate).

In a more particular embodiment, the composition of the present invention comprises 4.5 to 15.5 parts by weight of melamine polyphosphate and 14.5 to 25.5 parts by weight of poly(pentabromobenzylacrylate).

Optional Reinforcing Filler

The composition of the present invention optionally further comprises a reinforcing filler as are commonly known in the art, such as glass, clay, silica, silicates, alumina, borates and oxides.

In one embodiment, the reinforcing filler is a rigid fiber such as glass, carbon, metal and ceramic fibers, or a combination thereof. In a particular embodiment, the reinforcing filler is glass fibers. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. Glass fibers can be in the form of chopped strands having an average length of from 0.1 mm to 10 mm, and having an average aspect ratio of 2 to 5. In articles molded from the compositions, shorter lengths will typically be encountered because during compounding considerable fragmentation can occur.

For some uses, it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio-functional alkoxy silanes are especially useful. Fiber coatings with high thermal stability are preferred to prevent decomposition of the coating, which could result in foaming or gas generation during processing at the high melt temperatures required to form the compositions into molded parts.

For compositions ultimately employed for electrical uses, it is preferred to use fibrous glass fibers comprising lime-aluminum borosilicate glass that is relatively soda free, commonly known as "E-glass". The glass fibers may be made by standard processes, such as by steam or air blowing, flame blowing and mechanical pulling. Preferred glass fibers for plastic reinforcement may be made by mechanical pulling. The diameter of the glass fibers is generally about 1 to about 50 micrometers, preferably about 5 to about 20 micrometers. Smaller diameter fibers are generally more expensive, and glass fibers having diameters of about 10 to about 20 micrometers presently offer a desirable balance of cost and performance. In preparing the molding compositions, it is convenient to use the filamentous glass in the form of chopped strands of about one-eighth to about 2 inches long, which usually results in filament lengths between about 0.0005 to about 0.25 inch in the molded compounds. Such glass fibers are normally supplied by the manufacturers with a surface treatment compatible with the polymer component of the composition, such as a siloxane, titanate, or polyurethane sizing, or the like.

When used in the composition, the glass fiber is normally included at a level of from about 1 to 60 parts by weight, preferably 1 to 50 parts by weight, more preferably from about 15 to 45 parts by weight, and more preferably 25 to about 35 parts by weight.

In some embodiments, the compositions can optionally additionally comprise a particulate (non-fibrous) filler. Exemplary particulate fillers are inorganic fillers such as alumina, amorphous silica, alumino silicates, mica, clay, talc, glass flake, glass microspheres, metal oxides such as titanium dioxide, zinc sulfide, ground quartz, and the like.

In some embodiments, the reinforcing filler, for example glass fibers, is used in combination with a flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article.

When present, a particulate filler is used in an amount from more than zero to 3 parts by weight, specifically more than 0 to 2 parts by weight, more specifically from 0.1 to 1 parts by weight. In one embodiment, the composition comprises about 0.3 to about 0.7 parts by weight of talc. In a more particular embodiment, the composition comprises about 0.4 to about 0.6 parts by weight of talc.

The composition of the present invention may also optionally contain a nucleating agent such as are known in the art. Nucleating agents can be used to further accelerate the crystallization rate of the blend. They also can impart additional beneficial properties to the compositions such as thermal stability, increased density, stiffness, and/or texture. Examples of nucleating agent include, but are not limited to particulate (non-fibrous) non-organic compounds, organo-metallic compounds containing metal salts having a carboxyl group, polymeric organic compounds, phosphates and phosphites, sorbitol derivatives and metal salt ionomers.

Particulate (non-fibrous) non-organic compounds include, but are not limited to, carbon black, calcium carbonate, synthetic silicic acid and silicate salt, zinc white, high-sight clay, kaolin, basic magnesium carbonate, mica, talc, quartz powder, diatomaceous earth, dolomite powder, titanium oxide, zinc oxide, barium sulfate, calcium sulfate, alumina, calcium silicate, and boron nitride.

A specific nucleating agent for PBT compositions is talc, in particular, talc having an average largest dimension of less than 0.9 micrometers. In addition, or in the alternative, the talc can have a median particle size of less than 0.9 micrometers. In an embodiment, the equivalent spherical diameter of the particle is used to determine particle size. Use of these types of talc provides molded articles having both low shrinkage and a smooth surface finish. Use of these types of talc can also aid the crystallization of the polyalkylene terephthalate and increase heat resistance of the composition. Such talc is commercially available from Barretts Minerals Inc. under the trade name ULTRATALC®609.

In a particular embodiment, the composition contains 0.3 to 0.7 parts by weight of talc. Even more particularly, the composition contains or 0.4 to 0.6 parts by weight of talc.

The composition of the present invention may optionally include other additives which do not interfere with the previously mentioned desirable properties but enhance other favorable properties. Optional components and additives that may be compounded or blended into the composition of the invention in customary amounts include inert inorganic pigments, dyestuffs, lubricants, release agents, UV absorbers, UV stabilizers, anti-oxidants, anti-ozonants, stabilizers, stain-proofing agents, anti-static additives, anti-microbial agents, melt viscosity enhancers, impact modifiers, quenchers, processing aids, and the like. The different additives that can be incorporated in the compositions are commonly used and known to one skilled in the art. Illustrative descriptions of such additives may be found in R. Gachter and H. Muller, Plastics Additives Handbook, 6th edition, 2009.

In one embodiment, the composition contains a stabilizer selected from 2,6-di-t-butyl-p-cresol, 4-(hydroxymethyl)-2,6-di-t-butylphenol, 2,6-di-t-butyl-4-sec-butylphenol, or pentaerythritol tetrakis(3,5-di-tert-butyl-4-hydroxyhydrocinnamate. More particularly, the stabilizer is pentaerythritol tetrakis(3,5-di-tert-butyl-4-hydroxyhydrocinnamate. In one embodiment, the composition comprises about 0.02 to about 0.06 parts by weight of pentaerythritol tetrakis(3,5-di-tert-butyl-4-hydroxyhydrocinnamate. In a more particular embodiment, the composition comprises about 0.03 to about 0.05 parts by weight of pentaerythritol tetrakis(3,5-di-tert-butyl-4-hydroxyhydrocinnamate.

In another embodiment, the composition further comprises a quencher and a stabilizer. More particularly, the composition contains 0.1 to 0.5 or 0.2 to 0.4 parts by weight of a quencher which is zinc phosphate and 0.02 to 0.06 or 0.03 to 0.05 parts by weight of a stabilizer which is pentaerythritol tetrakis(3,5-di-tert-butyl-4-hydroxyhydrocinnamate.

Embodiments

The invention includes the following embodiments.

Embodiment 1. A polyalkylene terephthalate flame retardant composition that comprises:
  (a) 30 to 60 parts by weight of a polyalkylene terephthalate or a mixture of polyalkylene terephthalates;
  (b) 0.25 to 2.5 parts by weight of an antidrip agent; and
  (c) 4 to 18 parts by weight of melamine polyphosphate; and
  (d) 12 to 26 parts by weight of poly(pentabromobenzylacrylate);

provided that the combined amount of (c) and (d) is at least 18 parts by weight and less than or equal to 30 parts by weight,
wherein the composition is substantially antimony-free, and wherein:
  (i) the composition has a UL 94 (23° C./50% RH) test rating of V-0; or
  (ii) the composition has a UL 94 (70° C.) test rating of V-0; or
  (iii) the composition has a UL 94 (23° C./50% RH) test rating of V-0 and a UL 94 (70° C.) test rating of V-0.

Embodiment 2. The composition of embodiment 1 wherein the polyalkylene terephthalate is selected from the group consisting of polyethylene terephthalate, polybutylene terephthalate a combination of polybutylene terephthalates and a combination of polyethylene terephthalate and polybutylene terephthalate.

Embodiment 3. The composition of embodiment 2 wherein the polyalkylene terephthalate is a polybutylene terephthalate or a combination of polybutylene terephthalates.

Embodiment 4. The composition of embodiment 3, wherein the polyalkylene terephthalate comprises a polybutylene terephthalate having an intrinsic viscosity of 0.4 to 1.4 cm$^3$/g.

Embodiment 5. The composition of embodiment 3, wherein the polyalkylene terephthalate comprises a mixture of a first polybutylene terephthalate, having an intrinsic viscosity of >0.8 to 1.4 cm$^3$/g and a second polybutylene terephthalate having an intrinsic viscosity of 0.4 to 0.8 cm$^3$/g.

Embodiment 6. The composition of embodiment 5, wherein the composition comprises:
  (a) 5 to 9 parts by weight of the first polybutylene terephthalate, wherein the first polybutylene terephthalate has an intrinsic viscosity of 1.15 to 1.25 cm$^3$/g; and
  (b) 28 to 50 parts by weight of the second polybutylene terephthalate, wherein the second polybutylene terephthalate has an intrinsic viscosity of 0.6 to 0.7 cm$^3$/g.

Embodiment 7. The composition of embodiment 1, wherein the antidrip agent comprises polytetrafluoroethylene.

Embodiment 8. The composition of embodiment 7, comprising 0.25 to 2 parts by weight of polytetrafluoroethylene encapsulated in styrene acrylonitrile resin.

Embodiment 9. The composition of embodiment 6, wherein the antidrip agent comprises 0.25 to 2 parts by weight of polytetrafluoroethylene encapsulated in styrene acrylonitrile resin.

Embodiment 10. The composition of embodiment 7, comprising:
  (c) 4.25 to 15.75 parts by weight of melamine polyphosphate; and
  (d) 14.25 to 25.75 parts by weight of poly(pentabromobenzylacrylate).

Embodiment 11. The composition of embodiment 10, comprising:
  (c) 4.5 to 15.5 parts by weight of melamine polyphosphate; and
  (d) 14.5 to 25.5 parts by weight of poly(pentabromobenzylacrylate), provided that the combined amount of (c) and (d) is at least 18 parts by weight and less than 30 parts by weight.

Embodiment 12. The composition of embodiment 1 further comprising 1 to 60 parts by weight of a reinforcing agent.

Embodiment 13. The composition of embodiment 12 wherein the reinforcing agent comprises a glass fiber.

Embodiment 14. The composition of embodiment 13, wherein the composition comprises 25 to 35 parts by weight of a glass fiber.

Embodiment 15. The composition of embodiment 1, further comprising 0.3 to 0.7 parts by weight of a nucleating agent.

Embodiment 16. The composition of embodiment 15, wherein the nucleating agent is talc.

Embodiment 17. A polyalkylene terephthalate flame retardant composition, comprising:
(a1) 5 to 9 parts by weight of a first polybutylene terephthalate, wherein the first polybutylene terephthalate has an intrinsic viscosity of 1.15 to 1.25 cm$^3$/g;
(a2) 28 to 50 parts by weight of a second polybutylene terephthalate, wherein the second polybutylene terephthalate has an intrinsic viscosity of 0.6 to 0.7 cm$^3$/g;
(b) 0.5 to 2 parts by weight of polytetrafluoroethylene;
(c) 4.25 to 15.75 parts by weight of melamine polyphosphate;
(d) 14.25 to 25.75 parts by weight of poly(pentabromobenzylacrylate) provided that the combined amount of (c) and (d) is at least 18 parts by weight and less than or equal to 30 parts by weight; and
(e) 25 to 35 parts by weight of glass fiber,
wherein the composition is substantially antimony-free, and wherein:
(i) the composition has a UL 94 (23° C./50% RH) test rating of V-0; or
(ii) the composition has a UL 94 (70° C.) test rating of V-0; or
(iii) the composition has a UL 94 (23° C./50% RH) test rating of V-0 and a UL 94 (70° C.) test rating of V-0.

Embodiment 18. The composition of embodiment 17, wherein the glass fiber is E-glass fiber.

Embodiment 19. The composition of embodiment 18, comprising:
(a1) 6 to 8 parts by weight of first polybutylene terephthalate;
(a2) 30 to 40 parts by weight of second polybutylene terephthalate;
(b) 0.5 to 2 parts by weight of polytetrafluoroethylene encapsulated in styrene acrylonitrile resin;
(c) 4.5 to 15.5 parts by weight of melamine polyphosphate;
(d) 14.5 to 25.5 parts by weight of poly(pentabromobenzylacrylate) provided that the combined amount of (c) and (d) is at least 18 parts by weight and less than 30 parts by weight;
(e) 25 to 35 parts by weight of E-glass fiber; and
(f) 0.4 to 0.6 parts by weight of talc,
wherein the composition has a UL 94 (23° C./50% RH) test rating of V-0 and a UL 94 (70° C.) test rating of V-0.

Embodiment 20. An article prepared from the composition of embodiments 1-19.

Exemplification

The invention is further illustrated by the following non-limiting examples.

Various polybutylene terephthalate formulations were prepared containing bromine-based flame retardants, melamine-based flame retardants and combinations thereof to seek a PBT formulation that would demonstrate mechanical properties and flame retardance equivalent to that obtained when using a synergistic combination of antimony trioxide and the phenoxy-terminated carbonate oligomer of tetrabromobisphenol A (BC-52).

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Testing

Flammability testing, examples of compounds of the present invention and of comparator compounds, was conducted according to UL 94 requirements and was performed on 0.71 mm thick test specimens (i) after 48 hours of conditioning at 23° C. and 50% relative humidity (RH) (hereinafter the "UL 94 (23° C./50% RH)" test); and (ii) after 168 hours of conditioning at 70° C. (hereinafter the "UL 94 (70° C.)" test).

In addition, examples of compounds of the present invention and comparator compounds, were tested mechanically using the tests identified below in Table 1.

TABLE 1

| | ASTM Standards | Testing Conditions | Units |
|---|---|---|---|
| Melt Volume Rate (MVR) | D 1238-2010 | 250° C., 5 Kg | cm$^3$/10 minutes |
| NII | D 256-2010 | 23° C., 2 lb/ft | J/m |
| HDT | D 648-2007 | 1.82 Mpa | ° C. |
| Tensile Modulus | D 638-2010 | 5 mm/min, 23° C. | MPa |
| Tensile Strength at Break | D 638-2010 | 5 mm/min, 23° C. | MPa |

Examples of compositions of the present invention, and comparator compositions, were prepared from the materials listed in Table 2.

TABLE 2

| Component | Trade Name and Supplier |
|---|---|
| PBT I | Polybutylene Terephthalate (PBT) sold by SABIC Innovative Plastics as VALOX 315 with an intrinsic viscosity of 1.2 cm$^3$/g as measured in a 60:40 phenol/tetrachloroethane. |
| PBT II | Polybutylene Terephthalate (PBT), sold by SABIC Innovative Plastics as VALOX 195 with an intrinsic viscosity of 0.66 cm$^3$/g as measured in a 60:40 phenol/tetrachloroethane. |
| PBT Glass | Jushi 534A, E-Glass: Chopped 13 micron diameter fiberglass for use with PBT, Chopped Length: 3.0 mm. Obtained from Jushi. |
| MPP | MELAPUR 200 Melamine Polyphosphate, CAS Reg. No. 20208-95-1, available from BASF Corp. |
| MCA | MELAPUR MC25 melamine cyanurate, CAS Reg. No. 37640-57-6, available from BASF Corp. |
| PBBPA | 2-Propenoic acid, (2,3,4,5,6-bromophenyl)methyl ester, homopolymer, poly(pentabromobenzyl acrylate) CAS Reg. No. 59447-57-3, obtained from ICL Industrial Products as FR-1025. |
| BC-52 | Phenoxy-terminated carbonate oligomer of Tetrabromobisphenol A, CAS Reg. No. 94334-64-2, 52 percent bromine by weight, obtained from GREAT LAKES Solutions, a Chemtura Business |
| ATO/BC-52 MB | Flame resistant master batch containing BC-52, CAS Reg. No. 94334-64-2, and antimony trioxide (ATO) in a ratio of 3.1:1, obtained from Industrial Plastics Group. |

TABLE 2-continued

| Component | Trade Name and Supplier |
|---|---|
| Zinc Phosphate | $Zn_3(PO_4)_2$, CAS Reg. No. 7779-90-0, available from ICL Industrial Products. |
| Hindered Phenol Stabilizer | Pentaerythritol tetrakis(3,5-di-tert-butyl-4-hydroxyhydrocinnamate, CAS Reg. No. 6683-19-8, available from BASF Corp. |
| TSAN | Polytetrafluoroethylene encapsulated in poly(styrene-acrylonitrile), available from SABIC Innovative Plastics. |
| Fine Talc | Talcum, $Mg_3Si_4O_{10}(OH)_2$, CAS Reg. No. 14807-96-6 Average particle size <0.90 micrometer, available from Barretts. |
| PETS | Pentaerythritol tetrastearate, CAS Reg. No. 115-83-3, available from Faci SpA. |

Compounding and Molding

Compounding and molding were conducted as follows: The formulation components were tumble blended and then extruded on a 27-mm twin-screw extruder with a vacuum vented mixing screw, at a barrel and die head temperature of 240° C. to 265° C. and a screw speed of 300 rpm. The extrudate was cooled through a water bath before pelletizing. ASTM Izod and flexural bars were injection-molded on a van Dorn molding machine with a set temperature of approximately 240 to 265° C. The pellets were dried for 3 to 4 hours at 120° C. in a forced air-circulating oven before injection molding Results The formulations of examples of compositions of the present invention (E1-E17), and comparative compositions (C1-C12), and their observed physical, mechanical, and flame retardant test results, are provided in Tables 3 and 4 below.

Table 3 provides the UL 94 results that were achieved for a PBT formulation containing a synergistic combination of antimony trioxide and brominated polycarbonate (C1). A significant reduction in PBT composition flame retardance was observed when the antimony oxide was not present, even when the PBT composition contained significantly higher amounts of brominated polycarbonate (C2-C4).

TABLE 3

| Components (wt. percent) | C1 | C2 | C3 | C4 |
|---|---|---|---|---|
| PBT I | 8.5 | 9.31 | 8.57 | 7.76 |
| PBT II | 43.96 | 48.17 | 44.34 | 40.15 |
| PBT GLASS | 30 | 30 | 30 | 30 |
| ATO/BC-52 MB | 15.45 | — | — | — |
| BC52, Brominated PC | — | 10.43 | 15 | 20 |
| Zinc Phosphate | 0.3 | 0.3 | 0.3 | 0.3 |
| Hindered phenol stabilizer | 0.04 | 0.04 | 0.04 | 0.04 |
| TSAN | 1.05 | 1.05 | 1.05 | 1.05 |
| Fine Talc | 0.5 | 0.5 | 0.5 | 0.5 |
| PETS | 0.2 | 0.2 | 0.2 | 0.2 |
| Test (Performance Criteria) | | | | |
| UL 94 (23° C./50% RH) (V-0) | Pass | Fail | Fail | Fail |
| UL 94 (70° C.) (V-0) | Pass | Fail | Fail | Fail |
| SG (<1.8) | 1.65 | 1.61 | 1.61 | 1.68 |
| MVR @ 250° C., 5 kg 10 mins (>20 cm³/10 mins) | 31.8 | 35.1 | 36.7 | 33.7 |
| NII @ 23° C., 2 lbf/ft (>60 J/m) | 75.9 | 68.3 | 65.7 | 65.1 |
| HDT @ 1.82 Mpa (>200° C.) | 207 | 205.9 | 203.1 | 182.1 |
| Tensile modulus (>10000 Mpa) | 11060 | 10380 | 10225 | 10980 |
| Tensile Strength, Break (>110 Mpa) | 130 | 127 | 127 | 128 |

TABLE 4

| Components (wt. percent) | C5 | C6 | C7 | C8 | C9 | C10 | E1 | E2 | E3 |
|---|---|---|---|---|---|---|---|---|---|
| PBT I | 10.52 | 9.38 | 10.03 | 9.71 | 9.06 | 8.25 | 7.84 | 7.71 | 7.44 |
| PBT II | 54.39 | 48.53 | 51.88 | 50.20 | 46.85 | 42.66 | 40.57 | 39.87 | 38.47 |
| PBT Glass | 30 | 30 | 30 | 30 | 30 | 30 | 30 | 30 | 30 |
| MPP | 3 | 10 | 0 | 0 | 0 | 5 | 7.5 | 8.33 | 10 |
| PBBPA | 0 | 0 | 6 | 8 | 12 | 12 | 12 | 12 | 12 |
| Zinc Phosphate | 0.3 | 0.3 | 0.3 | 0.3 | 0.3 | 0.3 | 0.3 | 0.3 | 0.3 |
| Hindered phenol stabilizer | 0.04 | 0.04 | 0.04 | 0.04 | 0.04 | 0.04 | 0.04 | 0.04 | 0.04 |
| TSAN | 1.05 | 1.05 | 1.05 | 1.05 | 1.05 | 1.05 | 1.05 | 1.05 | 1.05 |
| Fine Talc | 0.5 | 0.5 | 0.5 | 0.5 | 0.5 | 0.5 | 0.5 | 0.5 | 0.5 |
| PETS | 0.2 | 0.2 | 0.2 | 0.2 | 0.2 | 0.2 | 0.2 | 0.2 | 0.2 |
| Test (Performance Criteria) | | | | | | | | | |
| UL 94 (23° C./50% RH) (V-0) | Fail | Fail | Fail | Fail | Fail | Fail | Fail | Fail | Fail |
| UL 94 (70° C.) (V-0) | Fail | Fail | Fail | Fail | Fail | Fail | Pass | Pass | Pass |
| SG (<1.8) | 1.61 | 1.65 | 1.63 | 1.62 | 1.68 | 1.72 | 1.72 | 1.74 | 1.72 |
| MVR @ 250° C., 5 kg 10 mins (>20 cm³/10 mins) | 23.8 | 9 | 35 | 33.8 | 35.1 | 33.7 | 29.2 | 28.9 | 29 |
| NII @ 23° C., 2 lbf/ft (>60 J/m) | 77.8 | 72 | 77.8 | 79.4 | 79.8 | 51.2 | 70.5 | 69.8 | 84.8 |
| HDT @ 1.82 Mpa (>200° C.) | 199.3 | 196.4 | 209.2 | 211 | 209.1 | 208.1 | 210 | 209.1 | 209.3 |
| Tensile modulus (>10000 Mpa) | 10580 | 11400 | 10900 | 10880 | 11200 | 12060 | 13260 | 12260 | 12440 |
| Tensile Strength, Break (>110 Mpa) | 127 | 128 | 129 | 131 | 132 | 124 | 135 | 122 | 122 |

| Components (wt. percent) | E4 | E5 | E6 | E7 | E8 | E9 | E10 | C11 |
|---|---|---|---|---|---|---|---|---|
| PBT I | 8.06 | 7.09 | 7.9 | 7.76 | 7.36 | 7.15 | 6.95 | 8.41 |
| PBT II | 41.73 | 36.7 | 40.89 | 40.15 | 38.05 | 37.01 | 35.96 | 43.50 |
| PBT Glass | 30 | 30 | 30 | 30 | 30 | 30 | 30 | 30 |
| MPP | 4 | 10 | 4.5 | 5 | 7.5 | 8.75 | 10 | 0 |
| PBBPA | 14 | 14 | 14.5 | 15 | 15 | 15 | 15 | 16 |
| Zinc Phosphate | 0.3 | 0.3 | 0.3 | 0.3 | 0.3 | 0.3 | 0.3 | 0.3 |
| Hindered phenol stabilizer | 0.04 | 0.04 | 0.04 | 0.04 | 0.04 | 0.04 | 0.04 | 0.04 |
| TSAN | 1.17 | 1.17 | 1.17 | 1.05 | 1.05 | 1.05 | 1.05 | 1.05 |
| Fine Talc | 0.5 | 0.5 | 0.5 | 0.5 | 0.5 | 0.5 | 0.5 | 0.5 |
| PETS | 0.2 | 0.2 | 0.2 | 0.2 | 0.2 | 0.2 | 0.2 | 0.2 |
| Test (Performance Criteria) | | | | | | | | |
| UL 94 (23° C./50% RH) (V-0) | Fail | Pass | Pass | Pass | Pass | Pass | Pass | Fail |
| UL 94 (70° C.) (V-0) | Pass | Pass | Pass | Pass | Pass | Pass | Pass | Fail |

TABLE 4-continued

| | | | | | | | | |
|---|---|---|---|---|---|---|---|---|
| SG (<1.8) | 1.70 | 1.72 | 1.72 | 1.73 | 1.75 | 1.74 | 1.77 | 1.71 |
| MVR @ 250° C., 5 kg 10 mins) (>20 cm³/10 mins) | 32.8 | 25.2 | 30.6 | 33 | 28.6 | 27.9 | 26.4 | 35.5 |
| NII @ 23° C., 2 lbf/ft (>60 J/m) | 78.4 | 73.9 | 76 | 73.5 | 64.2 | 70 | 64.4 | 80.7 |
| HDT @ 1.82 Mpa (>200° C.) | 208.7 | 208.8 | 208.3 | 209.1 | 208.2 | 208.9 | 208.6 | 208.6 |
| Tensile modulus (>10000 Mpa) | 11500 | 12280 | 11600 | 12100 | 12240 | 13020 | 12680 | 11340 |
| Tensile Strength, Break (>110 Mpa) | 118.9 | 120.3 | 115.1 | 126 | 118 | 124 | 119 | 129 |

| Components (wt. percent) | E11 | E12 | E13 | E14 | C12 | E15 | E16 | E17 |
|---|---|---|---|---|---|---|---|---|
| PBT I | 7.2 | 7 | 6.74 | 6.46 | 7.76 | 7 | 6.1 | 6.28 |
| PBT II | 37.21 | 36.24 | 34.84 | 33.45 | 40.15 | 35.91 | 31.81 | 32.51 |
| PBT Glass | 30 | 30 | 30 | 30 | 30 | 30 | 30 | 30 |
| MPP | 7.5 | 6.67 | 8.33 | 10 | 0 | 5 | 10 | 4 |
| PBBPA | 16 | 18 | 18 | 18 | 20 | 20 | 20 | 25 |
| Zinc Phosphate | 0.3 | 0.3 | 0.3 | 0.3 | 0.3 | 0.3 | 0.3 | 0.3 |
| Hindered phenol stabilizer | 0.04 | 0.04 | 0.04 | 0.04 | 0.04 | 0.04 | 0.04 | 0.04 |
| TSAN | 1.05 | 1.05 | 1.05 | 1.05 | 1.05 | 1.05 | 1.05 | 1.17 |
| Fine Talc | 0.5 | 0.5 | 0.5 | 0.5 | 0.5 | 0.5 | 0.5 | 0.5 |
| PETS | 0.2 | 0.2 | 0.2 | 0.2 | 0.2 | 0.2 | 0.2 | 0.2 |
| Test (Performance Criteria) | | | | | | | | |
| UL 94 (23° C./50% RH) (V-0) | Pass | Pass | Pass | Pass | Pass | Pass | Pass | Pass |
| UL 94 (70° C.) (V-0) | Pass | Pass | Pass | Pass | Fail | Pass | Pass | Pass |
| SG (<1.8) | 1.73 | 1.78 | 1.79 | 1.8 | 1.75 | 1.78 | 1.82 | 1.84 |
| MVR @ 250° C., 5 kg 10 mins) (>20 cm³/10 mins) | 25.9 | 26.8 | 26.7 | 25.8 | 33.5 | 27.1 | 21.5 | 26.9 |
| NII @ 23° C., 2 lbf/ft (>60 J/m) | 73 | 73 | 75 | 64.8 | 80.7 | 71.6 | 66.3 | 75 |
| HDT @ 1.82 Mpa (>200° C.) | 208.3 | 208.7 | 207.9 | 206.1 | 208 | 207.3 | 207 | 205.2 |
| Tensile modulus (>10000 Mpa) | 12040 | 13320 | 13760 | 13200 | 11800 | 12700 | 13460 | 12760 |
| Tensile Strength, Break (>110 Mpa) | 120 | 127 | 127 | 117 | 129 | 123 | 109 | 116.8 |

Table 4 shows that PBT formulations, containing either MPP or PBBPA failed to provide a level of flame retardance equivalent to that provided by the synergistic combination of antimony trioxide and brominated polycarbonate seen with the comparator C1. Particularly, Table 4 shows that PBT formulations, containing up to 10 parts by weight of MPP (C5-C6), or containing up to 20 parts by weight of PBBPA (C7-C9 and C11-C12), all failed both of the UL 94 flammability tests for samples conditioned for 48 hours and for samples conditioned for 168 hours. Surprisingly, it was discovered that when as little as 4.5 parts by weight of MPP was combined with as little as 14.5 parts by weight of PBBPA, in a PBT formulation, that the PBT formulation (E6) then passed both the 48 hour and the 168 hour UL 94 flammability tests while concurrently maintaining the tensile strength of the formulation at preferred levels (>110 Mpa). Table 4 also shows that the combined amount of MPP and PBBPA increased to a combined total of 30 parts by weight (10 parts MPP and 20 parts PBBPA (E16)), that the tensile strength of the PBT formulation was reduced below 110 Mpa. Table 4 further shows that PBT formulations even containing a combination of up to 5 parts by weight of MPP and up to 12 parts by weight PBBPA (C10) still failed both UL 94 tests.

The results in Table 4 also demonstrate that when using 4 to 18 parts by weight of MPP in combination with 12 to 26 parts by weight of PBBPA in the formulation, provided that the combination of MPP and PBBPA is a total of between 18 to 30 parts by weight, the PBT product compositions at least met the UL 94 requirements for samples conditioned at either 23° C. or at 70° C.

Table 4 also shows that when using 4.5 to 15.5 parts by weight of MPP in combination with 14.5 to 25.5 parts by weight of PBBPA in the formulation, provided that the combination of MPP and PBBPA is a total of 30 parts by weight, or less, the PBT product compositions all showed good flame properties and met the UL 94 V-0 rating for both the UL 94 (23° C./50% RH) and the UL 94 (70° C.) tests for a 0.71 mm thick test specimen.

The invention claimed is:

1. A polybutylene terephthalate flame retardant composition that comprises:
   (a) 5 to 9 parts by weight of a polybutylene terephthalate wherein the first polybutylene terephthalate has an intrinsic viscosity of 1.15 to 1.25 cm³/g; and 28 to 50 parts by weight of a second polybutylene terephthalate, wherein the second polybutylene terephthalate has an intrinsic viscosity of 0.6 to 0.7 cm³/g;
   (b) 0.25 to 2.5 parts by weight of polytetrafluoroethylene;
   (c) 4 to 18 parts by weight of melamine polyphosphate; and
   (d) 12 to 26 parts by weight of poly(pentabromobenzylacrylate), provided that the combined amount of (c) and (d) is at least 18 parts by weight and less than or equal to 30 parts by weight;
   wherein:
   the composition is substantially antimony-free,
   the composition has a tensile strength at break according to ASTM D638-2010 of greater than 110 Mpa; and
   wherein:
   (i) the composition has a UL 94 (23° C./50% RH) test rating of V-0; or
   (ii) the composition has a UL 94 (70° C.) test rating of V-0; or
   (iii) the composition has a UL 94 (23° C./50% RH) test rating of V-0 and a UL 94 (70° C.) test rating of V-0, wherein the composition further comprising 25 to 35 parts by weight of a glass fiber.

2. The composition of claim 1, wherein the polytetrafluoroethylene comprises 0.25 to 2 parts by weight of polytetrafluoroethylene encapsulated in styrene acrylonitrile resin.

3. The composition of claim 2, comprising:
   (c) 4.25 to 15.75 parts by weight of melamine polyphosphate; and (d) 14.25 to 25.75 parts by weight of poly(pentabromobenzylacrylate).

4. The composition of claim 3, comprising:
(c) 4.5 to 15.5 parts by weight of melamine polyphosphate; and
(d) 14.5 to 25.5 parts by weight of poly(pentabromobenzylacrylate) provided that the combined amount of (c) and (d) is at least 18 parts by weight and less than 30 parts by weight,
and wherein the composition has a UL 94 (23° C./50% RH) test rating of V-0 and a UL 94 (70° C.) test rating of V-0.

5. The composition of claim 1, further comprising 0.3 to 0.7 parts by weight of talc.

6. A polybutylene terephthalate flame retardant composition, comprising:
(a1) 5 to 9 parts by weight of a first polybutylene terephthalate, wherein the first polybutylene terephthalate has an intrinsic viscosity of 1.15 to 1.25 cm$^3$/g;
(a2) 28 to 50 parts by weight of a second polybutylene terephthalate, wherein the second polybutylene terephthalate has an intrinsic viscosity of 0.6 to 0.7 cm$^3$/g;
(b) 0.5 to 2 parts by weight of polytetrafluoroethylene;
(c) 4.25 to 15.75 parts by weight of melamine polyphosphate;
(d) 14.25 to 25.75 parts by weight of poly(pentabromobenzylacrylate) provided that the combined amount of (c) and (d) is at least 18 parts by weight and less than or equal to 30 parts by weight; and
(e) 25 to 35 parts by weight of glass fiber; wherein:
the composition is substantially antimony-free;
the composition has a tensile strength at break according to ASTM D638-2010 of greater than 110 MPa; and wherein:
(i) the composition has a UL 94 (23° C./50% RH) test rating of V-0; or
(ii) the composition has a UL 94 (70° C.) test rating of V-0; or
(iii) the composition has a UL 94 (23° C./50% RH) test rating of V-0 and a UL 94 (70° C.) test rating of V-0.

7. The composition of claim 6, wherein the glass fiber is E-glass fiber.

8. The composition of claim 7, comprising:
(a1) 6 to 8 parts by weight of first polybutylene terephthalate;
(a2) 30 to 40 parts by weight of second polybutylene terephthalate;
(b) 0.5 to 2 parts by weight of polytetrafluoroethylene encapsulated in styrene acrylonitrile resin;
(c) 4.5 to 15.5 parts by weight of melamine polyphosphate;
(d) 14.5 to 25.5 parts by weight of poly(pentabromobenzylacrylate) provided that the combined amount of (c) and (d) is at least 18 parts by weight and less than or equal to 30 parts by weight;
(e) 25 to 35 parts by weight of E-glass fiber; and
(f) 0.4 to 0.6 parts by weight of talc,
wherein the composition has a UL 94 (23° C./50% RH) test rating of V 0 and a UL 94 (70° C.) test rating of V-0.

9. An article prepared from the composition of claim 1.

* * * * *